United States Patent [19]

Sengoku

[11] Patent Number: 4,809,248

[45] Date of Patent: Feb. 28, 1989

[54] MEMORY DEVICE INCLUDING A ROTATING DISK AND MEANS FOR DETECTING CHANGE IN FRICTIONAL RESISTANCE BETWEEN THE DISK AND A READ/RECORD HEAD

[75] Inventor: Masaharu Sengoku, Hyogo, Japan

[73] Assignee: Mitsubishi Denki Kabushiki Kaisha, Tokyo, Japan

[21] Appl. No.: 7,466

[22] Filed: Jan. 28, 1987

[30] Foreign Application Priority Data

Mar. 5, 1986 [JP]  Japan .................................. 61-47732
Mar. 5, 1986 [JP]  Japan .................................. 61-47733

[51] Int. Cl.[4] ............................................ G11B 15/52
[52] U.S. Cl. ........................................ 369/47; 369/58; 360/73.03
[58] Field of Search ................. 369/47, 50, 54, 58; 360/73

[56] References Cited

U.S. PATENT DOCUMENTS 4,388,713  6/1983  Tatsuguchi ........................ 369/50
4,672,595  6/1987  Senso ................................ 369/50
4,680,746  7/1987  Senso ............................ 360/73 X

FOREIGN PATENT DOCUMENTS 58-114354  7/1983  Japan ................................ 369/50
60-101777  6/1985  Japan .

Primary Examiner—Aristotelis M. Psitos
Attorney, Agent, or Firm—Bernard, Rothwell & Brown

[57] ABSTRACT

A memory apparatus which is comprised within a computer or adapted to a peripheral apparatus of computer and also comprises a rotary apparatus which rotates a disk as an information recording medium, a rotation detector which detects rotating position of which controls rotation of said rotary apparatus said disk, a rotation control apparatus based on detection result of such rotation detector, a head which records and/or reads information to be stored in said disk and arranged opposed to the information recording surface of said disk and a detecting element which is responsive to an operation command output to said rotary apparatus from said rotation control apparatus and detects a pulse interval of rotary pulse signals of said rotation detector during the period from input of operation command output to said rotary apparatus from said rotation control apparatus to completion of the operation of command content of said rotary apparatus.

7 Claims, 14 Drawing Sheets

MEMORY DEVICE INCLUDING A ROTATING DISK AND MEANS FOR DETECTING CHANGE IN FRICTIONAL RESISTANCE BETWEEN THE DISK AND A READ/RECORD HEAD

BACKGROUND OF THE INVENTION

1. Field of the Invention

The present invention relates to a memory device which is comprised within an electronic computer or used for a terminal equipment of a computer, and more particularly to a memory device which is capable of preventing a trouble in missing of data being recorded on an information recording medium.

2. Description of the Prior Art

A variety of memory devices, which are capable of storing information by accumulating it in a recording medium by chemical, electrical, magnetical and mechanical means, have generally been proposed for the cases where such information is required to be stored. Particularly, since electronic computers have been introduced quickly in various technical fields in recent years, a memory device which records information magnetically or optically using a disk type information recording medium (hereinafter called a disk as required) is attracting attention of those who are skilled in such fields for storing computer programs and information such as results of operational processing.

An example of such a memory device has been disclosed in patent laid-open No. 60-101777 laid on June 5, 1985 by the Patent Office in Japan, "Hard Disk", "ELECTRONICS" p. 60–65, April, 1985, published by OHM Co., Ltd., and "Knowledge of Software" (Koji Yada, 1982), p. 75–85, published by OHM Co., Ltd. FIG. 1 illustrates a magnetic disk apparatus as an example of such memory device having the structure which schematically shows the outline of "positioning mechanism of magnetic head" reported by Japanese patent laid-open No. 60-101777. In this figure, a reference numeral 1 represents a support plate; 2, a rotary apparatus such as a spindle motor installed on the support plate 1; 3, a disk such as a magnetic disk as a recording medium loaded to a rotating shaft of the rotary apparatus 2; 4, a pressure spring of which one end is fixed to an arm 5 and the other end is provided with a head 6, for example, such as a record and read magnetic head with its surface located upward. 7 represents a support mechanism which supports the arm 5. 8 represents a rotation detector which detects rotation of a rotary apparatus 2 and therefore rotation of the disk 3 and outputs a rotary pulse signal. 9 represents a head transfer mechanism which comprises the support mechanism 7 and transfers the head 6 in the radius direction of disk 3 and 10, a head drive circuit which drives the head transfer mechanism 9. 11 represents a record and read circuit which outputs a record signal to the head 6 for writing information to the disk 3 or provides a read signal from the signal read from the disk 3 through the head 6 and 12 represents a disk drive circuit which drives the rotary apparatus 2.

13 represents a control apparatus which, for example, comprises a central processing unit, receives a rotary pulse signal as an input from the rotation detector 8, totally controls the head drive circuit 10, record and read circuit 11 and disk drive circuit 12, and also receives the information to be recorded on the disk 3 as an input and outputs the information read from the disk 3 in connection with a computer (not shown).

Operations of the structure of FIG. 1 are explained hereunder. While, the rotary apparatus 2 and disk 3 are not operated, the head 6 is pressured in contact with the recording surface of a disk 3 with an upward pressure of the pressure spring 4 which pressurizes the head 6.

When the rotary apparatus 2 is rotatably driven in the starting of the rotary apparatus 2 with the disk drive circuit 12 which has received the start command from the control apparatus 13, the disk 3 rotates, a downward floating force is generated to the head 6 by the viscous air flow generated on the surface of disk 3 and thereby the head 6 is gradually floated on the recording surface of disk 3.

Meanwhile, when the disk 3 rotates, a rotary pulse signal is output from the rotation detector 8. The control apparatus 13 controls rotation of rotary apparatus 2 through the disk drive circuit 12 in accordance with such rotary pulse signal, for example, to the constant value of 3600 r.p.m. Under the constant rotation of the rotary apparatus 2 and disk 3, the floating force is balanced with a pressure force of pressure spring 4 which pressurizes the head 6 and a small gap is maintained between the disk 3 and the head 6. Thereby, the head 6 is arranged opposed to the disk 3.

When a record or read command is sent to the record and read circuit 11 through the control apparatus 13 from a computer (not shown) under such condition, information is recorded to or read from the disk 3 through the head 6 by the control of the record and read circuit 11. Of course, in this case, the head transfer mechanism 9 which has received a drive command from the control apparatus 13 through the head drive circuit 10 in order to set the head 6 on the predetermined track on the disk 3 drives the support mechanism 7 in the radius direction of the disk 3. Next, during control of the rotary apparatus 2, when the drive stop command is applied to the disk drive circuit 12 from the control apparatus 13 and the rotary apparatus 2 is no longer driven by the disk drive circuit 12, rotating velocity of the rotary apparatus 2 and disk 3 is lowered by the control. Thereby, a floating force of head 6 becomes smaller than a pressure of the pressure spring 4, the head 6 gradually comes closer to the surface of disk 3 and rotation stops. As a result, the head 6 is placed again in contact with the recording surface of disk 3.

Since the memory apparatus of the prior art is formed as explained above, it has raised the problems that the head is indirectly or directly in contact with the disk when dust generated within the inside of memory apparatus flows through a very small gap between the head and disk or the memory apparatus receives an intensive vibration or impact from the outside. Accordingly, the head or disk is gradually damaged, the head cannot be floated from the disk after use over a long period of time and thereby the stored information on the disk is lost.

Such problems are generated because either the head or the disk or both of them are damaged and a friction resistance between them becomes large. When a friction resistance becomes large, the brake time becomes short or the start time becomes long due to the influence of such friction resistance when the rotating magnetic disk and rotary apparatus stop or when the magnetic disk and rotary apparatus start to rotate and thereby contact condition between the head and information recording surface of magnetic disk becomes longer. Therefore, it is important for preventing generation in the troubles of apparatus to detect that a friction resistance is increasing by detecting an interval between rotary pulse signals while the rotary apparatus is started or braked and to provide an adequate measure before it becomes impossible that the head be floated from the disk surface.

SUMMARY OF THE INVENTION

It is an object of the present invention to provide a memory device which prevents generation of trouble such as destruction of stored information by detecting rotary pulse signals of a rotary apparatus and a rotating information recording medium and also detecting irregularity of pulse interval of a rotary pulse signal when the rotary apparatus starts to operate or to be braked, and thereby confirming that a friction resistance between the record/read apparatus and a recording medium is large.

It is another object of the present invention to assure longer operation life of apparatus and medium by preventing not only a trouble in destruction stored information but also irregular contact condition between the record and read apparatus and an information recording medium during rotation.

In order to achieve above objects, a memory device of the present invention provides a rotation detecting means which detects rotating position of a rotating information recording medium while the rotary apparatus is braked or started to rotate and also a pulse interval detecting means which detects pulse interval of rotary pulse signal output from such rotation detecting means.

DETAILED DESCRIPTION OF THE PREFERRED EMBODIMENTS

Figure 1:
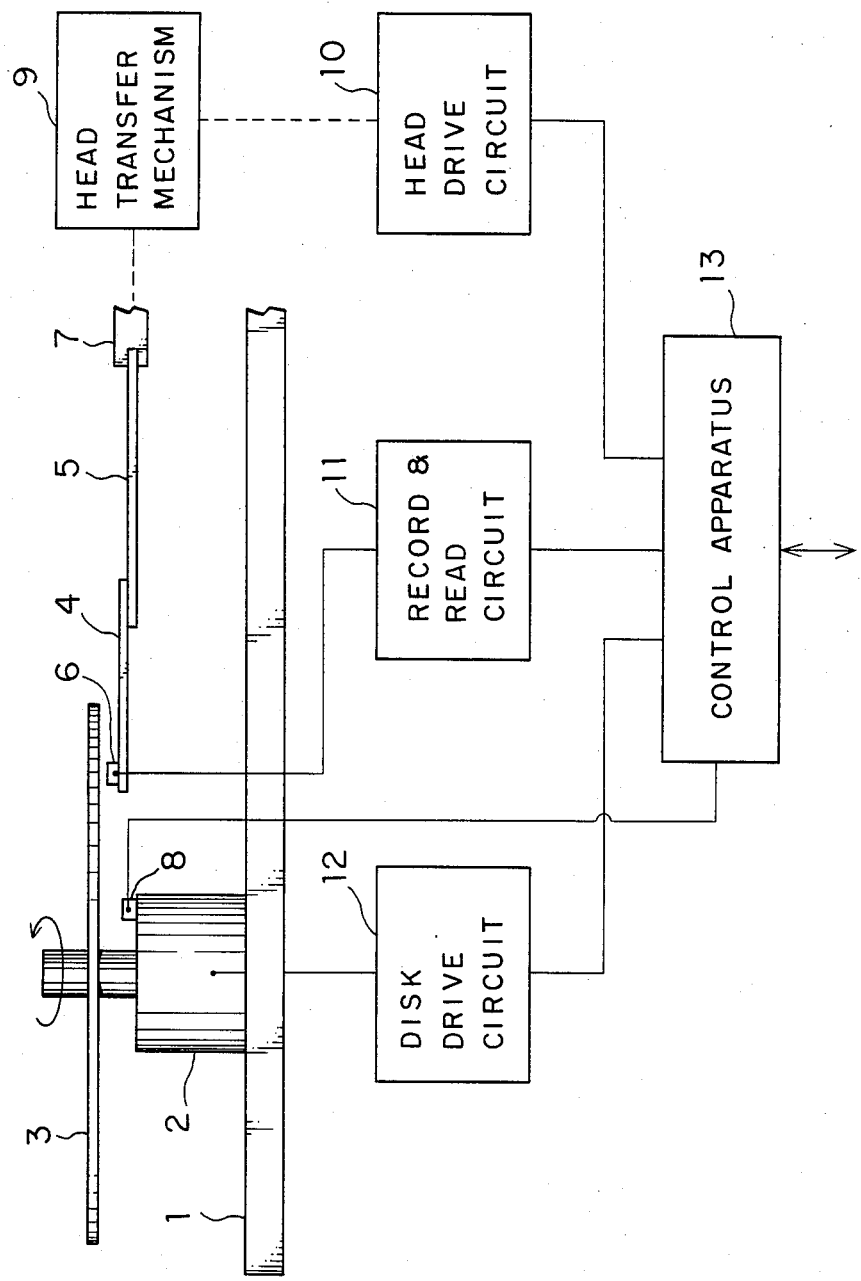
FIG. 1 is a block diagram illustrating an example of a memory apparatus of the prior art.
Figure 2:
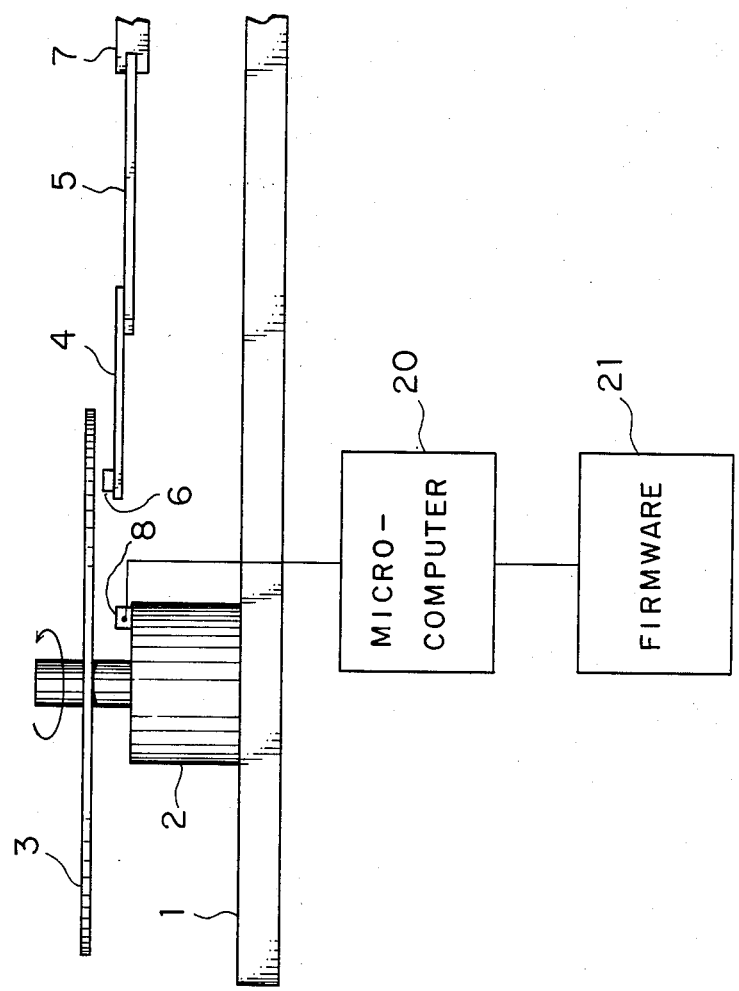
FIG. 2 is a block diagram illustrating a first embodiment of a memory apparatus of the present invention.
Figure 3:
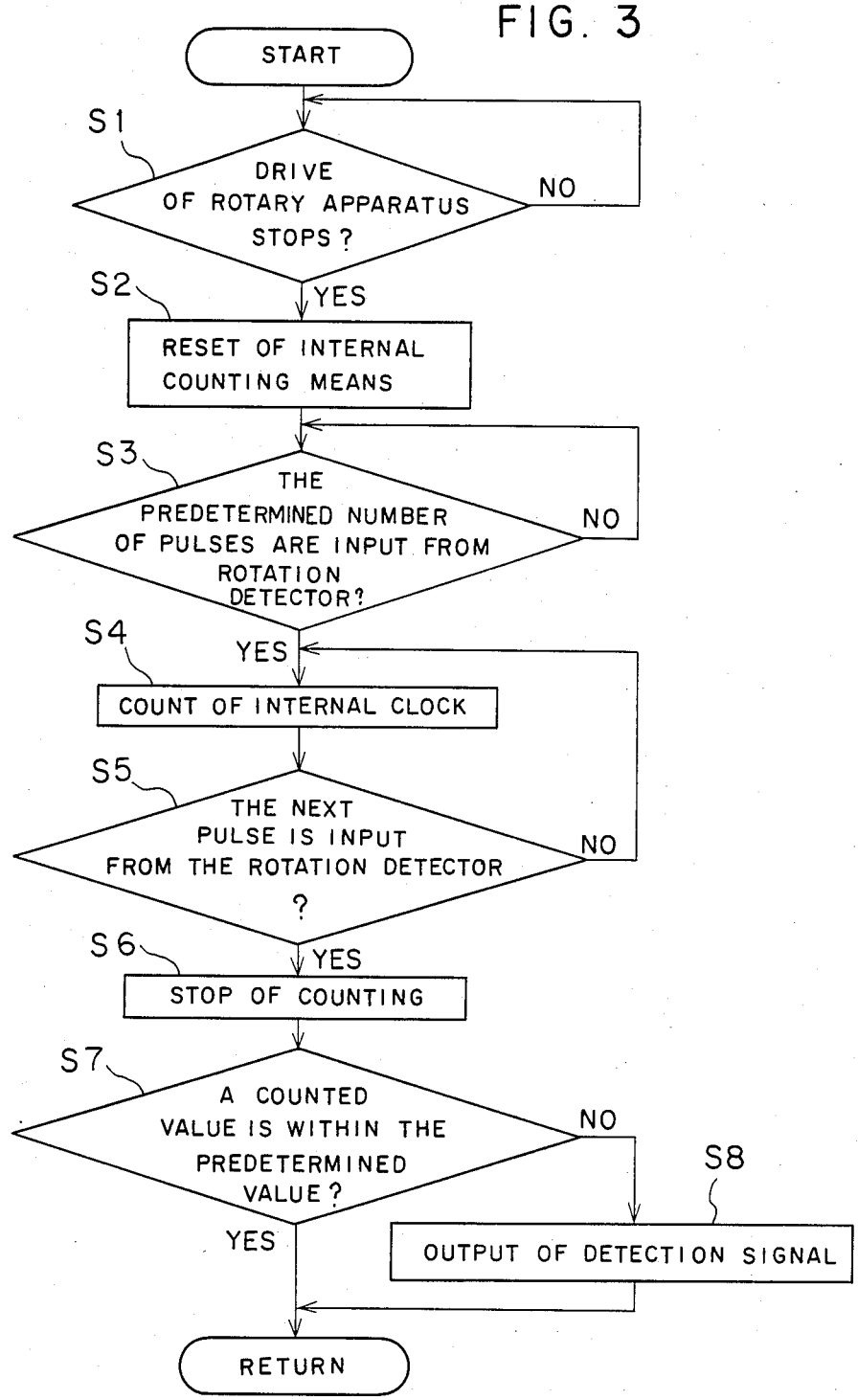
FIG. 3 is a flowchart for explaining operations based on the firmware of the embodiment illustrated in FIG. 2.
Figure 4:
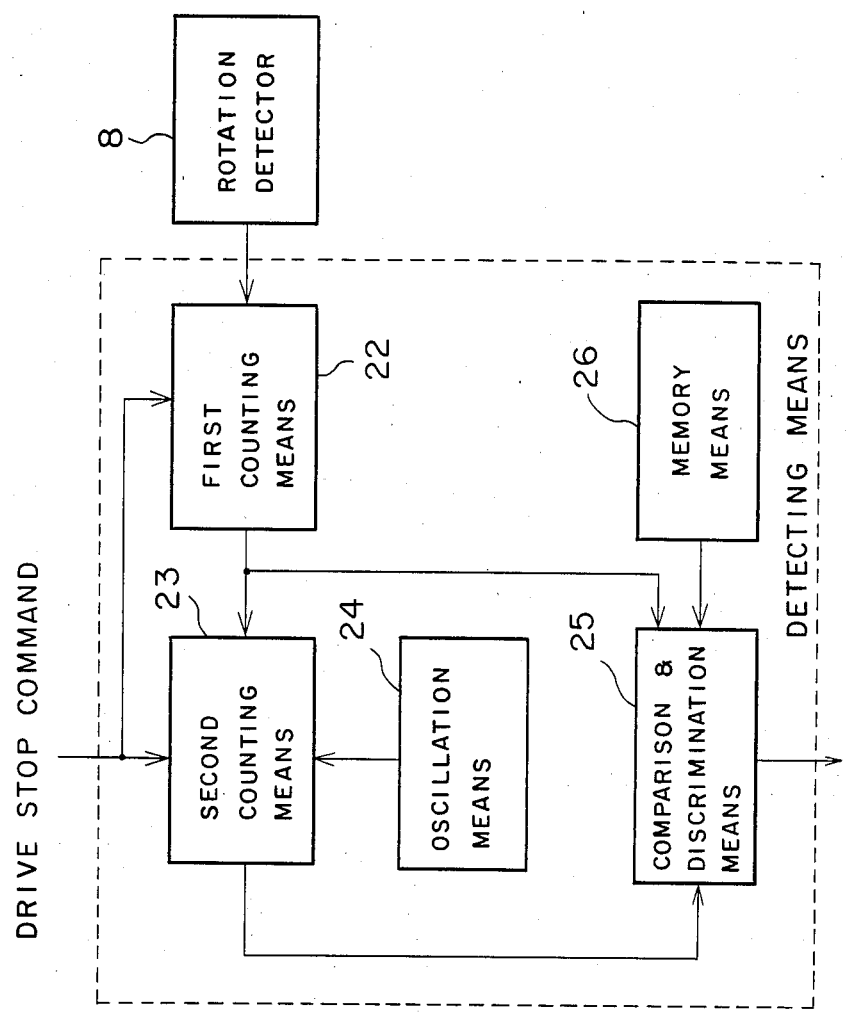
FIG. 4 is a block diagram illustrating structure of firmware illustrated in FIG. 2 of the embodiment shown in FIG. 1.

The preferred embodiments of the present invention are explained in detail with reference to the attached drawings. FIG. 2 is a memory apparatus which represents a first embodiment of the present invention. In FIG. 2, the same reference numerals 1-8 as those in FIG. 1 designate the same elements as those of the prior art. A reference numeral 20 is a microcomputer which is responsive to a rotary pulse signal sent from the rotation detector 8 and 21 is a firmware consisting of the flows described later being connected to the microcomputer 20. This microcomputer 20 may also operate as a part of the control apparatus described concerning the prior art. The elements having the same structure as the elements of prior art of FIG. 1 are not illustrated. FIG. 3 is a flowchart of the detecting means for executing contents of FIG. 2 and FIG. 4 is a block diagram of the detection means which executes contents of FIG. 2. In FIG. 4, 22 is a first counting means which resets and starts the counting operations with a drive stop command, counts a rotary pulse signal sent from the rotation detector 8, provides an output of a count start signal when it has counted a predetermined number and also provides an output of a count stop signal when it receives the next rotary pulse signal. 23 is a second counting means which counts the clocks sent from an oscillation means 24 in accordance with the signal sent from the first counting means 22. Frequency of oscillation pulse of this oscillation means 24 is extremely higher than the maximum frequency of a rotary pulse signal of the rotation detector 8. 25 is a comparison and discrimination means which extracts a counted value when the second counting means 23 has completed the counting, compares it with a predetermined value being stored in a memory means 26 for predetermined value and then outputs a detected signal. The detecting means is formed by the elements designated by the reference numerals 22-26 enclosed within the broken line.

Operations of the first embodiment are explained with reference to FIG. 3. The structure is in the waiting condition until the drive stop command to the rotary apparatus 2 is generated (step S1). When the drive stop command is generated, the counting means (the first and second counting means 22, 23 in FIG. 4) are reset by such drive stop command (step S2). The structure is in the waiting condition until the predetermined number of pulses are input from the rotation detector 8 (step S3). When the predetermined number of pulses are input, the internal clocks (the clocks output from the oscillation means 24) are counted (step S4). This counting is carried out until the next rotary pulse signal is input from the rotation detector 8 (step S5). Next, in case it is acknowledged that a rotary pulse signal is input (acknowledgment in the step S5), counting of internal clocks is suspended (step S6). This counted value is compared with a predetermined value to confirm whether it is smaller than the predetermined value or not (step S7). In case it is acknowledged that a counted value is smaller than the predetermined value, the relation between the disk 3 and head 6 is judged normal and operation returns to the start. If a counted value is larger than the predetermined value, relation between the disk 3 and head 6 is judged defective, and a pulse, for example, is output as the detection signal (step S8).

When relationship between disk 3 and head 6 is irregular, a friction resistance between disk 3 and head 6 becomes large, resulting in a large braking force during the braking period of rotary apparatus 2. Therefore, when the disk 3 rotates for the predetermined amount after stop of rotation of rotary apparatus 2, the rotating velocity of disk 3 under defective condition is lower than that under the normal condition. Therefore, normal and defective conditions can be detected by measuring the interval of rotary pulse signal as explained above.

Figure 5:
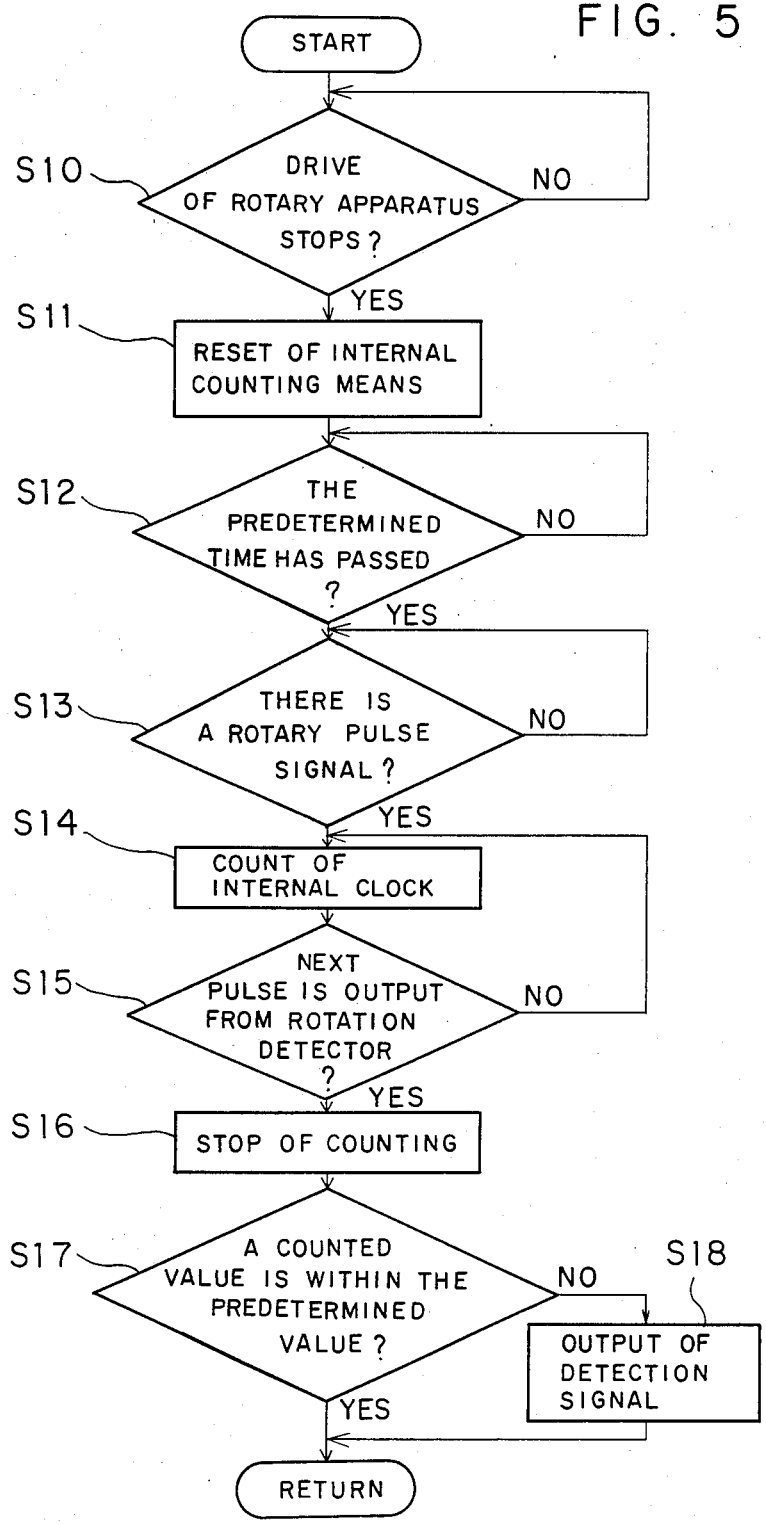
FIG. 5 is a flowchart for explaining operations of a second embodiment employing a different firmware structure from that illustrated in FIG. 2.
Figure 6:
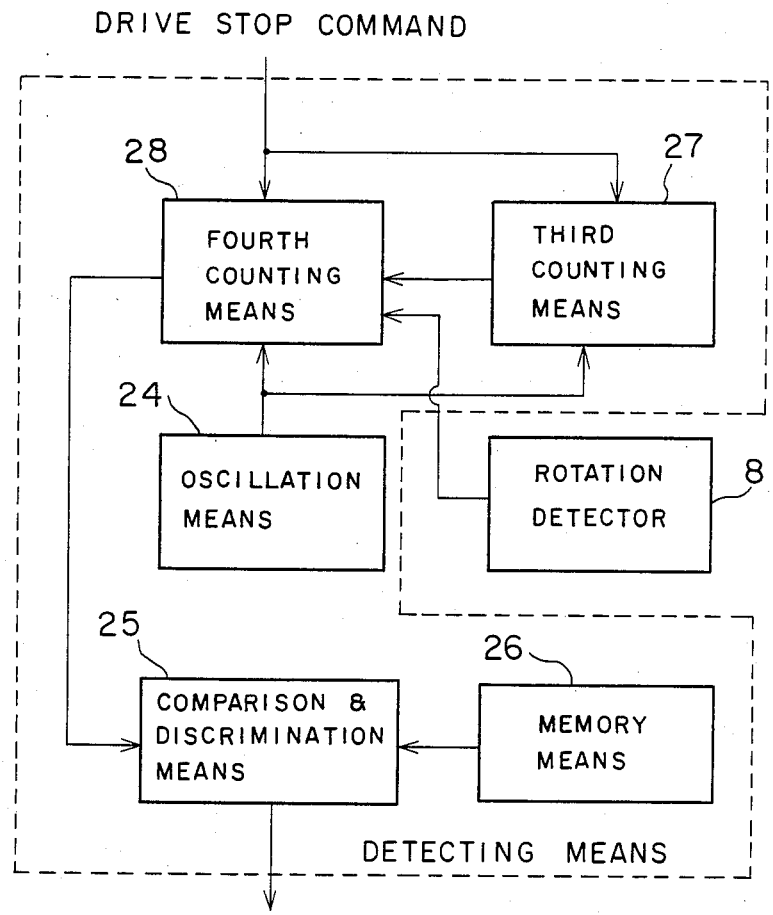
FIG. 6 is a block diagram illustrating a structure of the second embodiment which realizes operations shown in FIG. 5.

In above embodiment, a pulse interval of the neighboring rotary pulse signals is detected but an interval of three or more pulses of the rotary pulse signal can also be detected by setting the step S5 to the judgement for "the predetermined number of pulses is input from the rotation detector or not". In this case, the first counting means 22 outputs the counting stop signal to the second counting means 23 and comparison means 25 when the predetermined number of pulses are counted in the step S5. FIG. 5 is a flowchart explaining the operations of a second embodiment which employs firmware different from that of FIG. 2 and FIG. 6 indicates a structure of the detecting means for this embodiment. In FIG. 6, the reference numerals 24–26 designate the same elements as those of FIG. 4. A reference numeral 27 is a third counting means which is reset by the drive stop command, counts the clock of oscillation means 24 and outputs the count start allowing signal when it counts the predetermined number of clocks. 28 is a fourth counting means which is reset by the drive stop command and starts the counting of clocks sent from the oscillation means 24 from the timing where the first rotary pulse signal is input from the rotation detector 8 after the counting start allowing signal is input from the third counting means 27. This counting is continued until the next rotary pulse signal is input from the rotation detector 8. An output of the fourth counting means 28 is applied to the comparison and discrimination means 25. The detecting means is formed by the elements designated by the reference numerals 24–28.

Figure 7:
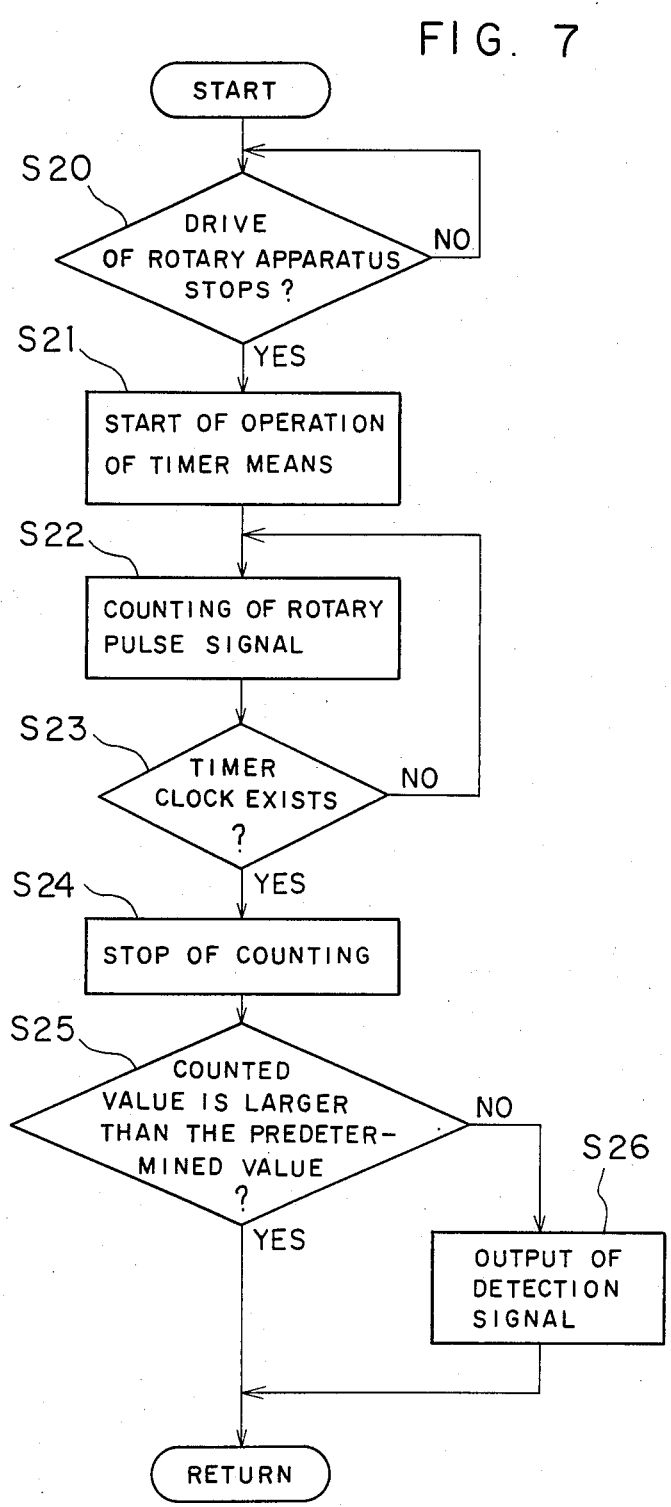
FIG. 7 is a flowchart for explaining operations of a third embodiment employing a different firmware structure from that illustrated in FIG. 2.
Figure 8:
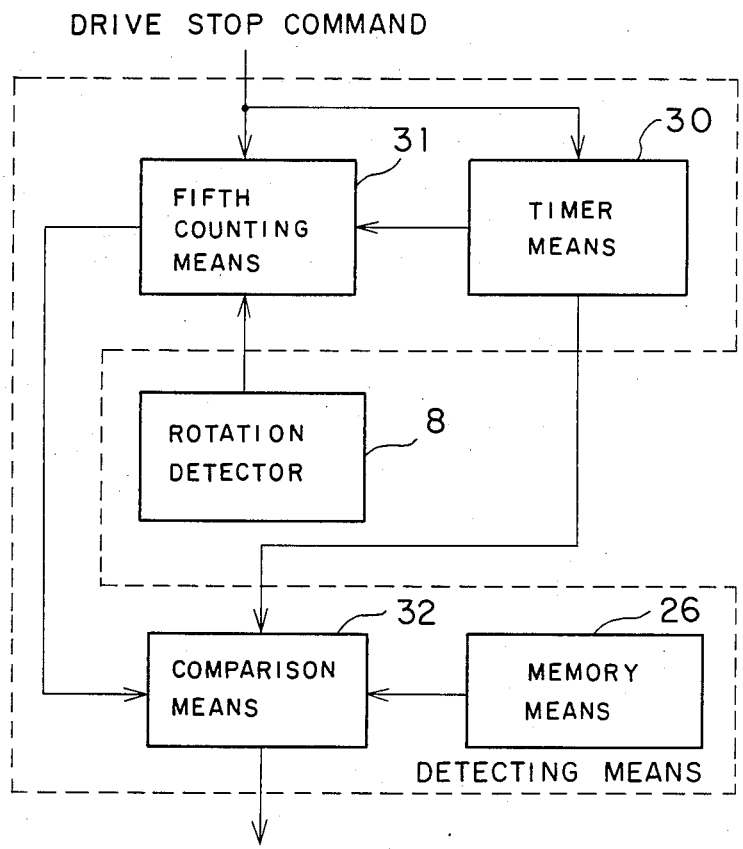
FIG. 8 is a block diagram illustrating a structure for realizing operations of FIG. 7.

Operations of the second embodiment are explained hereunder. The structure is in the waiting condition until the drive stop command of rotary apparatus 2 is generated (step S10). When the drive stop command is generated, the counting means (the third and fourth counting means 27, 28 of FIG. 6) are reset (step S11). Next, the structure is in the waiting condition again until the predetermined time has passed (step S12). After the predetermined period, it is judged whether a rotary pulse signal is output from the rotation detector or not (step S13). When existence of rotary pulse signal is judged, the internal clocks are counted (step S14). This counting operation is continued until the next rotary pulse signal is generated from the rotation detector 8. When it is acknowledged that the next rotary pulse signal is generated from the rotation detector 8 (acknowledgement in the step S15), such counting operation stops (step S16). This counted value is judged whether it is within the predetermined value or not (step S17). In case a value is judged within the predetermined value, operation is considered normal and returns to the start. If it is judged larger than the predetermined value, a friction resistance between the disk 3 and head 6 is judged too large and abnormal, and a detection signal such as a pulse, for example, is output (step S18) and the operation returns to the start. While the rotary apparatus 2 is being braked, the rotating velocity of the disk 3 under the abnormal condition is generally lowered more quickly than that under the normal condition after drive of the rotary apparatus 2 is suspended due to the friction resistance between the disk 3 and head 6. Therefore, after the predetermined time has passed, the rotating velocity of disk 3 under the abnormal state becomes lower than that under the normal condition. It means in this case that a pulse interval of rotary pulse signal output from the rotation detector 8 under the abnormal condition is longer than that under the normal condition. Therefore in this embodiment, normal and abnormal conditions can be detected by detecting the pulse interval under such conditions. Also, in the case of this embodiment, the step S15 is set to "the number of rotary pulses input from the rotation detector 8 has reached the predetermined number or not", and the normal or abnormal condition can be detected by measuring the interval of three or more rotary pulse signals. FIG. 7 is a flowchart explaining the operations of the third embodiment which employs firmware different from that of FIG. 2 and FIG. 8 illustrates a structure of the detecting means for this embodiment. In FIG. 8, 30 is a timer means which starts operations with the drive stop command and outputs a timer clock after a predetermined period. 31 is a fifth counting means which starts the counting of the rotary pulse signal sent from the rotation detector 8 with the drive stop command and stops the counting with the timer clock sent from the timer means 30. 32 is a comparison means which compares a counted value of the fifth counting means 31 with a reference value previously stored in the predetermined value memory means 26 and then outputs a detection signal. In this embodiment, the rotary pulse signal of rotation detector 8 is counted only for the predetermined period after the drive of rotary apparatus 2 has stopped, a counted value is then detected and a detected signal is output. The detection means is composed of the elements enclosed within a broken line.

Figure 9:
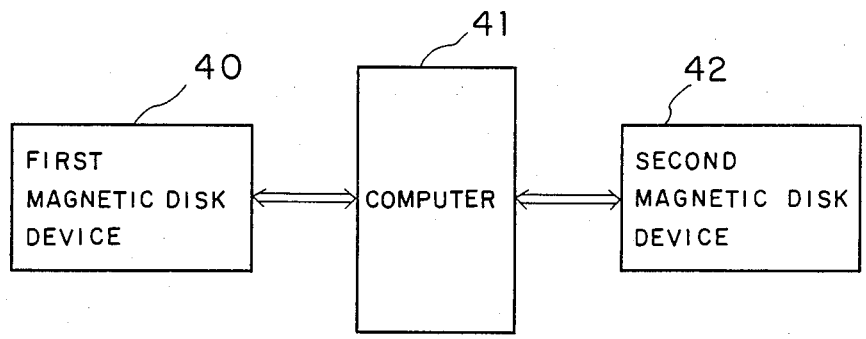
FIG. 9 is a block diagram illustrating a fourth embodiment of a memory apparatus of the present invention.

Operations of this embodiment is apparent from the flow of steps 20–26 of FIG. 7 and therefore it is omitted here. As a modification, it is possible to count the rotary pulse signal of the rotation detector 8 only for the predetermined period after the predetermined period from issuance of the drive stop command. The drive stop command is used in above embodiment, but it may be replaced with a control signal which is output after the predetermined period from issuance of the drive stop signal. FIG. 9 illustrates an application example to be considered as a fourth embodiment of the present invention. 40, 42 are first and second magnetic disk devices shown in FIG. 2 being connected each other through a computer 41. When a detection signal is sent to a computer 41 from the first magnetic disk device 40, the computer 41 immediately outputs a command to the first magnetic disk device 40 in order to read the information from the disk 3 before the head 6 of the first magnetic disk device 40 becomes impossible to float on the disk 3 and to store such information to the second magnetic disk device 42 and thereby the stored information can be protected from destruction. In each embodiment described above, the rotation detector 8 may use a rotating position information obtained from the disk 3 through the head 6 and this method also provides an effect similar to that of the foregoing embodiments. In above embodiments, the head is used for record and read, bit it may be replaced with a head for only record or read and in this case the record and read circuit is replaced with a record circuit or a read circuit. Moreover, in above embodiment, a magnetic disk apparatus is used but it may be a sound record, video record and other memory apparatus as a well known memory apparatus employing the optical system, photomagnetic system, laser system, field system, charge system and other systems.

In above embodiments, irregular phenomenon due to deterioration of a memory apparatus such as a disk has been checked by detecting rotating operation after the drive stop command is generated to the rotating mechanism or disk of a disk apparatus. However, the present invention is not limited to the control during stop of drive and condition of apparatus may also be checked by detecting condition of rotating operation when the memory apparatus starts operation.

Figure 10:
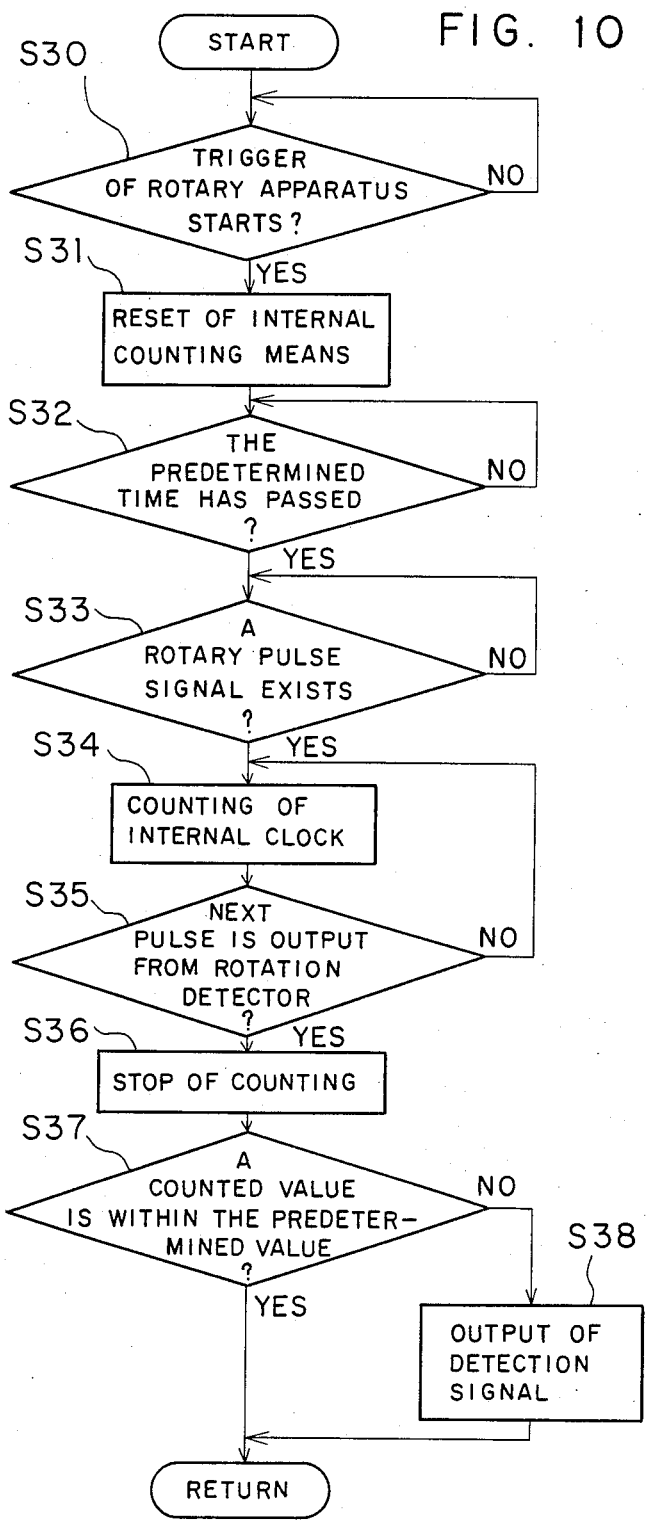
FIG. 10 is a flowchart for explaining operations of a fifth embodiment employing a different firmware structure from that illustrated in FIG. 2.
Figure 11:
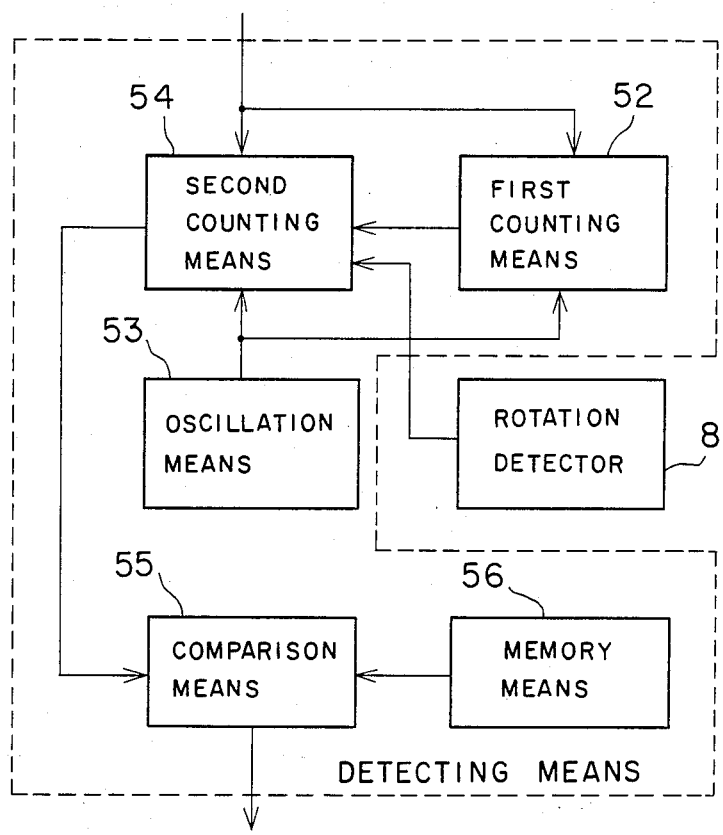
FIG. 11 is a block diagram illustrating a structure of a detecting means which realizes operations of FIG. 10.

For example, FIG. 10 is a flowchart explaining the operations of a fifth embodiment employing firmware different from that shown in FIG. 2. FIG. 11 is a block diagram of a detecting means which realizes such flowchart. In FIG. 11, 52 is a first counting means which is reset by the trigger start command in order to count the clocks of the oscillation means 53 and outputs the counting start allowing signal when the predetermined number of clocks are counted. 54 is a second counting means which is reset by the trigger start command and starts the counting of clocks sent from the oscillation means 53 from the timing where the first rotary pulse signal is input from the rotation detector 8 after inputting the count start allowing signal from the first counting means 52. This counting is continued until the next rotary pulse signal is input from the rotation detector 8. 55 is a comparison means which compares a predetermined value stored previously to memory means 56 for the predetermined value and a counted value of the second counting means 54 and outputs a detection signal. The detecting means is formed by the elements designated by the reference numerals 52–56 enclosed by the broken line of FIG. 11.

Operations of this embodiment are then explained. The structure is in the waiting condition until the trigger start command is generated to the rotary apparatus 2 (step S30). When the trigger command is generated, the counting means (first and second counting means 52 and 54 in FIG. 11) are reset (step S31). Next, the structure is in the waiting condition until the predetermined time has passed (step S32). After the predetermined period, it is judged whether the rotary pulse signal is output from the rotation detector 8 or not (step S33). When the rotary pulse signal is judged as being generated, the internal clock is counted (step S34). This counting operation is executed until the next rotary pulse signal is generated from the rotation detector 8. When it is acknowledged that the next rotary pulse signal is generated from the rotation detector 8 (acknowledgement in the step S35), the counting operation is stopped (step S36). The counted value is judged whether it is larger than the predetermined value or not (step S37). When it is judged within the predetermined value, operation is judged normal and returns to the start. When it is judged larger than the predetermined value, a friction resistance between the disk 3 and head 6 is judged abnormally large and operation returns to the start outputting, for example, a detection signal such as a pulse (step S38).

In general, the rotation velocity of disk 3 under the abnormal condition is delayed to rise from that under the normal condition due to friction resistance between the disk 3 and head 6 when the rotary apparatus 2 is triggered. Therefore, when a predetermined time has passed from the start time of the rotary apparatus 2, the rotating velocity of disk 3 under the abnormal condition is delayed from that under the normal condition. It means that a pulse interval of the rotary pulse signal output from the rotation detector 8 under the abnormal condition becomes longer than that under the normal condition. Therefore, in this embodiment, normal or abnormal condition can be detected by detecting a pulse interval in such a condition.

In the case of this embodiment, the step S35 is set to "the rotary pulse signal input from the rotation detector 8 has reached the predetermined number or not" and such detection can also be realized by measuring intervals of three or more rotary pulse signals.

Figure 12:
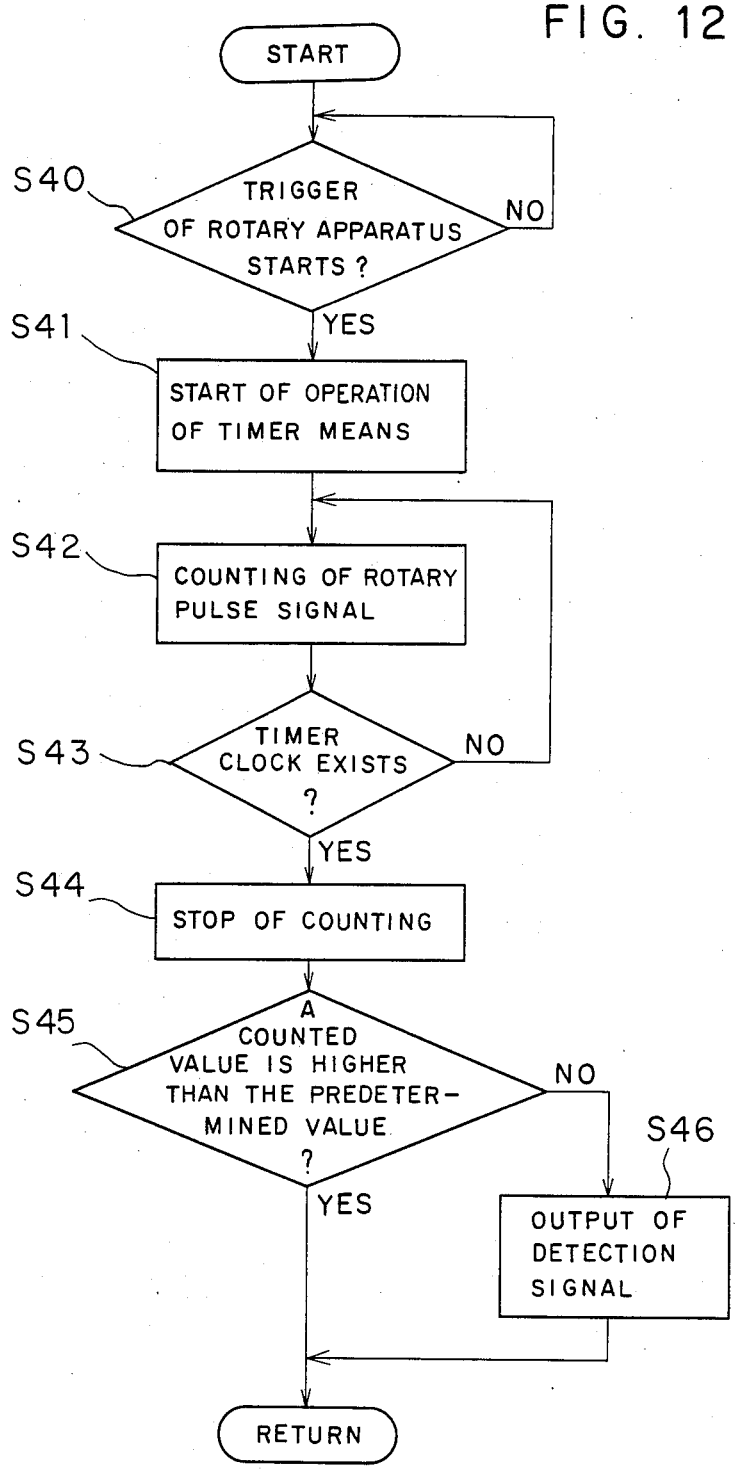
FIG. 12 is a flowchart for explaining operations of a sixth embodiment employing a different firmware structure from that of a memory apparatus of FIG. 2.
Figure 13:
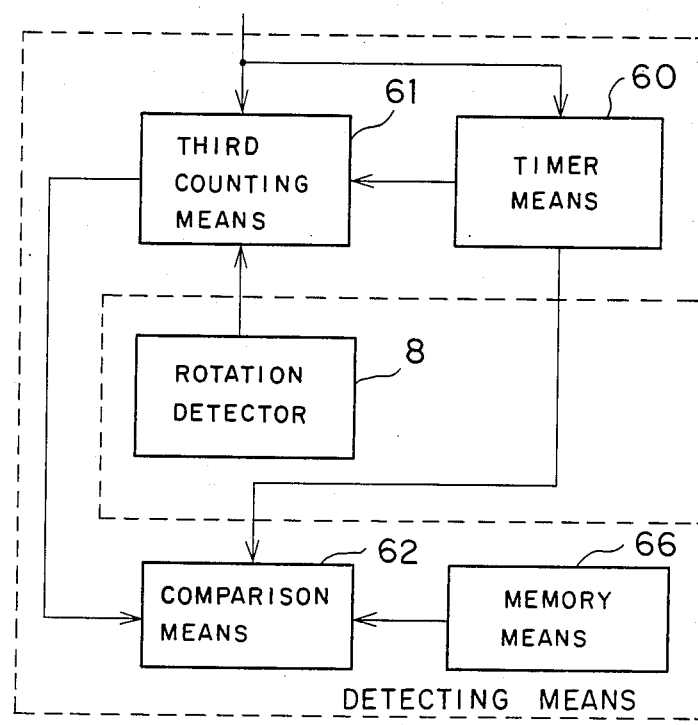
FIG. 13 is a block diagram illustrating a structure of a detecting means which realizes operations of FIG. 12.

FIG. 12 is a flowchart explaining the operations of the sixth embodiment employing firmware different from that of FIG. 2 and FIG. 13 illustrates a structure of the detecting means which realizes such flowchart. In FIG. 13, 60 is a timer means which starts operation with the start command and outputs the timer clock after the predetermined time. 61 is a third counting means which starts the counting of the rotary pulse signal sent from the rotation detector 8 with the start command and stops the counting with the timer clock sent from the timer means 60. 62 is a comparison means which compares a counted value of the third counting means 61 with the reference value which is previously stored in memory means 66 for the predetermined value and outputs a detection signal. In this sixth embodiment, the rotary pulse signal of the rotation detector 8 is counted for the predetermined period from the trigger starting time of the rotary apparatus, such counted value is detected and a detection signal is output. The detecting means is formed by the elements designated by the reference numerals 60, 61, 62 and 66.

The structure is in the waiting condition until the trigger start command is generated (step S40). When generation of trigger start command is acknowledged (acknowledgement in the step S40), the timer starts operation in order to generate timer clock (step S41). The rotary pulse signal output from the rotation detector 8 is counted from the operation start time of the timer (step S42). This counting operation is continued until generation of timer clock is acknowledged (acknowledgement in the step S43). When generation of timer clock is acknowledged, the counting is suspended (step S44). This counted value corresponds to the number of rotary pulse signals output from the rotation detector 8 during the period from trigger start time to the predetermined time. When the rotary apparatus 2 is being triggered, friction resistance between the disk 3 and the head 6 under the abnormal condition is certainly larger than that under the normal condition. Therefore, the rotation velocity of the disk under the abnormal condition is less than that under the normal condition. Accordingly, the counted value under the normal condition is comparatively larger than that under abnormal condition.

Next, operation advances to the next step from the step S44 and it is judged that such counted value is within the predetermined value or not (step S45). When it is judged larger than the predetermined value, operation is judged normal and it returns to the start. When it is judged smaller than the predetermined value (not acknowledged), the operation is judged abnormal, a detection signal such as a pulse, for example, is output (step S46) and the operation returns to the start.

As a modification, it is possible to count the rotary pulse signal of the rotation detector 8 for the predetermined time after the predetermined period from the trigger start time.

In above fifth and sixth embodiments, the trigger start command is used but a control signal which is output after the predetermined time from the trigger start command can also be used.

Figure 14:
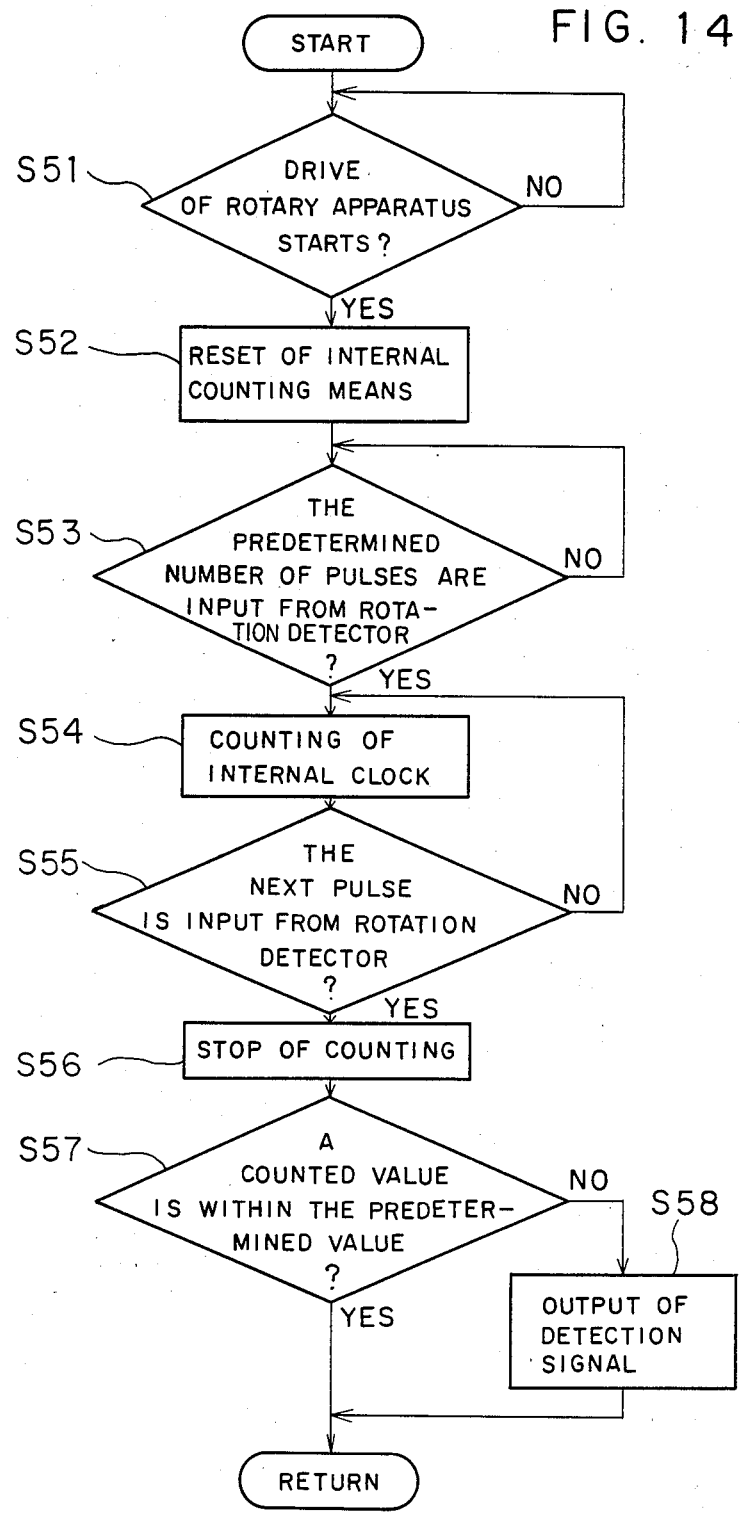
FIG. 14 is a flowchart for explaining operations of a seventh embodiment employing a different firmware structure from that of memory apparatus of FIG. 2.
Figure 15:
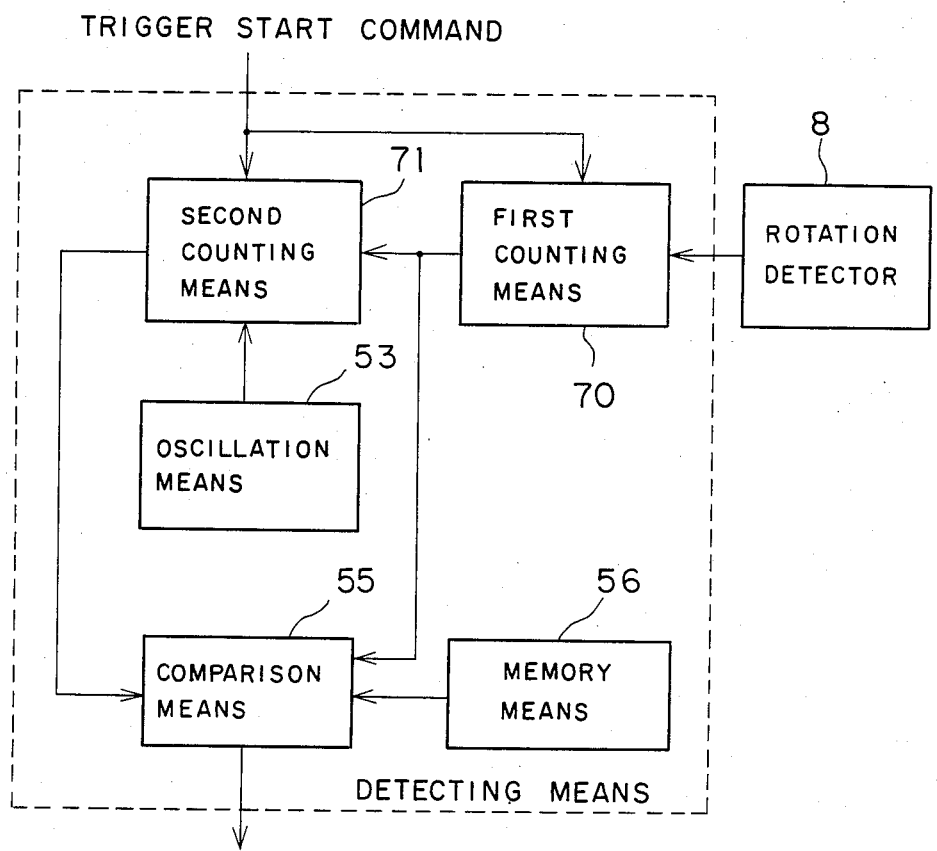
FIG. 15 is a block diagram illustrating a detecting means which realizes operations of FIG. 14.

FIG. 14 is a flowchart explaining the operations of a seventh embodiment which employs firmware different from that of FIG. 2. FIG. 15 is a structure of the detection means which executes such flowchart.

In FIG. 15, reference numerals 53, 55, 56 designate the elements similar to that of the fifth embodiment shown in FIG. 11. The reference numeral 70 designate a first counting means which is reset with the trigger start command and starts the counting operation, counts the rotary pulse signals sent from the rotation detector 8, outputs the count start signal when a predetermined number of pulses is counted and outputs the count stop signal when the next rotary pulse signal is input. 71 is a second counting means which counts the clock sent from the oscillation means 53 in accordance with the signal sent from the first counting means 70. Frequency of the oscillation pulse of the oscillation means 53 is remarkably higher than the maximum frequency of the rotary pulse signal of the rotation detector 8. The detecting means is formed by the elements designated by the reference numerals 53, 55, 56, 70, 71 enclosed within the broken line.

Next, operations of this embodiment are explained. The structure is in the waiting condition until the trigger start command to the rotary apparatus 2 is generated (step S51). When the trigger start signal is generated, the counting means (the first and second counting means 70, 71 shown in FIG. 15) are reset by the trigger start command (step S52). The structure is again in the waiting condition until the predetermined number of pulses are input from the rotation detector 8 (step S53). When the predetermined number of pulses are input, the internal clocks (clocks output from the oscillation means 53) are counted (step S54). This counting is continued until the next rotary pulse signal is input from the rotation detector 8 (step S55). When it is acknowledged that the next rotary pulse signal is input (acknowledgement in the step S55), the counting of the internal clock is stopped (step S56). This counted value is compared with the predetermined value to determine whether it is within the predetermined value or not (step S57). In case the counted value is acknowledged within the predetermined value, relation between the disk 3 and head 6 is judged normal and operation returns to the start. In case the counted value is judged larger than the predetermined value, relation between the disk 3 and head 6 is judged abnormal and a detection signal, such as pulse, is output (step S58), for example, and the operation returns to the start.

Like the fifth to seventh embodiments in FIG. 10 to FIG. 15, also in the system which realizes detection of rotation based on the trigger start command, the first and the second magnetic disk devices may be connected through the computer as in the case of the fourth embodiment of FIG. 9. Moreover, the microcomputer may be replaced with a computer, the firmware may be replaced with software and the microcomputer and firmware may be replaced with the control apparatus of computer. In such a case, the same effect can be obtained.

As described above, the present invention provides the effect that the possibility of destruction of stored information of disk resulting because the head cannot float above the disk can be detected and such destruction of information can be prevented because the pulse interval of the rotary pulse signal output from the rotation detector which detects rotating position of the disk is detected when the rotary apparatus is to be triggered.

What is claimed is:

1. A memory apparatus comprised of a rotary apparatus which rotates a disk as the information recording medium, a rotation detector which detects rotating position of said disk and provides a signal, a rotation control apparatus which controls rotation of said rotary apparatus based on the detection result of said rotation detector and a head which records and/or reads the information to be stored in said disk and arranged opposed to the information recording surface of said disk,
   said memory apparatus comprising a detecting means which is responsive to an operation command output to said rotary apparatus from said rotation control apparatus and detects pulse interval of the rotary pulse signal of said rotation detector during the period from input of such operation command to the receipt of the signal from said rotation detector by said detecting means.

2. A memory apparatus as defined in claim 1, wherein said detecting means is responsive to a drive stop command output to said memory rotary apparatus from said rotation control apparatus and detects a pulse interval of rotary pulse signals of said rotation detector during the period from input of the drive stop command to stop of said rotary apparatus after rotation of said disk only for a predetermined number of rotations.

3. A memory apparatus as defined in claim 2 wherein said detecting means comprising;
   a first counting means which is responsive to a drive stop command sent from said rotation control apparatus and a rotary pulse signal of said rotation detector and outputs a count start signal when the rotary pulse signal is counted up to the predetermined value and also outputs the count stop signal when the next rotary pulse signal is input,
   an oscillation means which oscillates a clock pulse which is higher than the rotary pulse signal of said rotation detector,
   a second counting means which counts the clock pulse sent from said oscillation means based on said count start signal sent from said first counting means,
   a predetermined value memory means which stores a desired predetermined value determined previously, and
   a comparison means which extracts a counted value when said second counting means has completed the counting, compares said predetermined value stored in said predetermined value memory means with said counted value and then outputs a detection signal.

4. A memory apparatus as defined in claim 2, wherein said detecting means comprises;
   an oscillation means which oscillates clock pulse having the frequency higher than the rotary pulse signal of said rotation detector,
   a first counting means which is reset by said drive stop command, counts the clock of said oscillation means and outputs a counting start allowing signal when such clock is counted up to a predetermined number, a second counting means which is reset by said drive stop command, responsive to said count start signal output from said first counting means, starts counting of the clock sent from said oscillation means when the first rotary pulse signal is input from said rotation detector and counts the clocks until the next rotary pulse signal is input from said rotation detector, a predetermined value memory means which stores a desired predetermined value, and a comparison means which extracts a counted value when said second counting means has completed the counting, compares such value with said predetermined value and outputs a detection signal.

5. A memory apparatus as defined in claim 1, wherein said detecting means is so structured that is responsive to a drive stop command output to said rotary apparatus from said rotation control apparatus and detects a pulse interval of rotary pulse signal of said rotation detector during the period from input of such drive stop command to stop of said rotary apparatus.

6. A memory apparatus as defined in claim 1, wherein said detecting means is so structured that is responsive to a trigger start command output to said rotary apparatus from said rotation control apparatus and detects a pulse interval of rotary pulse signals of said rotation detector during the period from input of the trigger start command to the start condition of said rotary apparatus after predetermined number of rotations of said disk.

7. A memory apparatus as defined in claim 1, wherein said detecting means is so structured that is responsive to the trigger start command output to said rotary apparatus from said rotation control apparatus and detects a pulse interval of rotary pulse signals of said rotation detector during the period from input of such trigger start command to start condition of said rotary apparatus.

* * * * *

UNITED STATES PATENT AND TRADEMARK OFFICE
CERTIFICATE OF CORRECTION

PATENT NO. : 4,809,248
DATED : February 28, 1989
INVENTOR(S) : MASAHARU SENGOKU

It is certified that error appears in the above-identified patent and that said Letters Patent is hereby corrected as shown below:

```
Front Page, Col. 2, [57], line 7, after "of" insert --said
                    disk, a rotation control apparatus--;
Front Page, Col. 2, [57], line 8, delete "said disk, a
                    rota-";
Front page, Col. 2, [57], line 9, delete "tion control
                    apparatus".
Col. 2, line 66, "in the" should be --of--; same line,
                 "of" should be --in the--.
Col. 4, line 18, delete "the" (second occurrence);
Col. 4, line 19, after "of" insert --the--.
Col. 6, line 68, "bit" should be --but--.
```

Signed and Sealed this

Twenty-fifth Day of December, 1990

*Attest:*

HARRY F. MANBECK, JR.

*Attesting Officer*     *Commissioner of Patents and Trademarks*